US012672149B2

(12) United States Patent
Tang et al.

(10) Patent No.: US 12,672,149 B2
(45) Date of Patent: Jun. 30, 2026

(54) INFORMATION TRANSMISSION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Hai Tang, Dongguan (CN); Hua Xu, Ottawa (CA)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 319 days.

(21) Appl. No.: 18/438,671

(22) Filed: Feb. 12, 2024

(65) Prior Publication Data

US 2024/0188091 A1 Jun. 6, 2024

Related U.S. Application Data

(63) Continuation of application No. 17/713,984, filed on Apr. 5, 2022, now Pat. No. 11,950,255, which is a
(Continued)

(51) Int. Cl.
*H04W 72/23* (2023.01)
*H04J 11/00* (2006.01)
(Continued)

(52) U.S. Cl.
CPC ......... *H04W 72/23* (2023.01); *H04J 11/0073* (2013.01); *H04J 11/0076* (2013.01);
(Continued)

(58) Field of Classification Search
CPC ..... H04L 5/0023; H04L 5/023; H04L 5/0048; H04J 11/0076; H04J 11/0079;
(Continued)

(56) References Cited

U.S. PATENT DOCUMENTS

2009/0180435 A1 7/2009 Sarkar
2012/0076028 A1* 3/2012 Ko ........................ H04B 7/0417
370/252
(Continued)

FOREIGN PATENT DOCUMENTS

CN 101489285 A 7/2009
CN 102055517 A 5/2011
(Continued)

OTHER PUBLICATIONS

Qualcomm Incorporated: "Synchronization signal bandwidth and multiplexing consideration", 3GPP Draft; R2-1702584 Synchronization Signal Bandwidth and Multiplexing Consideration, 3rd Generation Partnership Project (3GPP), Mobile Competence Centre ; 650, Route Des Lucioles ; F-06921 Sophia-A, vol. RAN WG1, No. Athens, Greece; Feb. 13, 2017-Feb. 17, 2017 Feb. 12, 2017 (Feb. 12, 2017), XP051209738.
(Continued)

*Primary Examiner* — Syed Ali
(74) *Attorney, Agent, or Firm* — Ladas & Parry LLP

(57) ABSTRACT

An information transmission method, a terminal device and a network device are provided. The method includes: a terminal device receives a first synchronization signal block and a physical downlink control channel sent by a network device in a first time slot or a first mini-slot, the first time slot or the first mini-slot includes N symbols, the first synchronization signal block occupies M consecutive symbols in the first time slot or the first mini-slot, the first synchronization signal block includes a synchronization signal and a physical broadcast channel, M and N are positive integers, and M≤N.

20 Claims, 8 Drawing Sheets

Related U.S. Application Data continuation of application No. 16/496,098, filed as application No. PCT/CN2017/078049 on Mar. 24, 2017, now Pat. No. 11,317,392.

(51) Int. Cl.

| | |
|---|---|
| *H04L 5/00* | (2006.01) |
| *H04L 5/02* | (2006.01) |
| *H04W 72/0446* | (2023.01) |
| *H04W 56/00* | (2009.01) |

(52) U.S. Cl.
CPC ........ *H04J 11/0079* (2013.01); *H04L 5/0023* (2013.01); *H04L 5/0048* (2013.01); *H04L 5/023* (2013.01); *H04W 72/0446* (2013.01); *H04W 56/00* (2013.01)

(58) Field of Classification Search
CPC ........... H04J 11/0073; H04W 56/0015; H04W 72/23; H04W 72/0446; H04W 56/00
See application file for complete search history.

(56) References Cited

U.S. PATENT DOCUMENTS

| | | | | |
|---|---|---|---|---|
| 2013/0242882 A1 | 9/2013 | Blankenship | | |
| 2013/0242932 A1 | 9/2013 | Tiirola | | |
| 2013/0322361 A1* | 12/2013 | Ko | ...................... | H04B 7/0639 |
| | | | | 370/329 |
| 2014/0079012 A1 | 3/2014 | Kim | | |
| 2015/0333880 A1* | 11/2015 | Yi | .......................... | H04L 5/005 |
| | | | | 370/329 |
| 2016/0094315 A1 | 3/2016 | Noh et al. | | |
| 2016/0197657 A1* | 7/2016 | Ko | ....................... | H04L 5/0053 |
| | | | | 370/329 |
| 2016/0227567 A1 | 8/2016 | Xu et al. | | |
| 2016/0353440 A1* | 12/2016 | Lee | ...................... | H04W 72/53 |
| 2016/0366576 A1 | 12/2016 | You et al. | | |
| 2017/0070312 A1* | 3/2017 | Yi | ....................... | H04W 72/541 |
| 2017/0134881 A1* | 5/2017 | Oh | .......................... | H04L 5/14 |
| 2018/0167946 A1* | 6/2018 | Si | ............................. | H04L 5/00 |
| 2018/0234931 A1 | 8/2018 | Ly et al. | | |
| 2018/0254796 A1 | 9/2018 | Akkarakaran et al. | | |
| 2018/0279218 A1 | 9/2018 | Park et al. | | |
| 2018/0279229 A1 | 9/2018 | Dinan et al. | | |
| 2019/0254026 A1 | 8/2019 | Liu et al. | | |
| 2020/0092846 A1 | 3/2020 | Deng et al. | | |
| 2021/0399769 A1* | 12/2021 | Park | ....................... | H04L 5/005 |

FOREIGN PATENT DOCUMENTS

| | | | |
|---|---|---|---|
| CN | 103391264 A | 11/2013 | |
| CN | 103609036 A | 2/2014 | |
| CN | 104519455 A | 4/2015 | |
| CN | 105230094 A | 1/2016 | |
| EP | 2482485 A1 | 8/2012 | |
| EP | 3057252 A1 | 8/2016 | |
| JP | 2009-212981 A | 9/2009 | |
| JP | 2014033271 A | 2/2014 | |
| JP | 2014057309 A | 3/2014 | |
| JP | 2020-511053 A | 4/2020 | |
| RU | 2567235 C1 | 11/2015 | |
| WO | 2009092332 A1 | 7/2009 | |
| WO | 2012069081 A1 | 5/2012 | |
| WO | 2018156301 A1 | 8/2018 | |

OTHER PUBLICATIONS

Supplementary European Search Report in the European application No. 17901662.1, mailed on Feb. 11, 2020.
English translation of the Written Opinion of the International Search Authority in the international application No. PCT/CN2017/078049, mailed on Dec. 14, 2017.
3GPP TSG RAN WG1 Meeting #83 R1-156410, Anaheim, USA, Nov. 15-22, 2015, Source: Ericsson, Title: M-PDCCH definition for MTC, Agenda Item: 6.2.1.3, Document for: Discussion and Decision. pages 1-3. 3 pages.
3GPP TSG-RAN WG1 NR AdHoc R1-1700787, Jan. 16-20, 2017, Spokane, USA, Agenda item: 5.1.1.1.4, Source: Qualcomm Incorporated, Title: Synchronization signal sequence design consideration, Document for: Discussion/Decision. pp. 1-9. 9 pages.
Notice of Allowance of the Chinese application No. 201780088283.1, issued on Mar. 1, 2024. 6 pages with English translation.
Second Office Action of the Brazilian application No. BR1120190196722, issued on May 7, 2024. 8 pages with English translation.
Notice of Allowance of the Russian application No. 2019133584, issued on Jun. 19, 2020.
First Office Action of the Chile application No. 201902706, issued on Jul. 28, 2020.
First Office Action of the Malaysian application No. PI2019005522, issued on Oct. 5, 2023. 3 pages.
Supplementary European Search Report in the European application No. 23191330.2, mailed on Nov. 14, 2023. 7 pages.
Second Office Action of the Japanese application No. 2022-037928, issued on Dec. 19, 2023. 6 pages with English translation.
Qualcomm Incorporated, Multi-beam SYNC design, 3GPP TSG RAN WG1 Meeting #87 R1-1612024, Reno, Nevada, USA, Nov. 14-18, 2016.
First Office Action of the Japanese application No. 2019-552080, issued on Mar. 16, 2021.
Office Action of the Indian application No. 201917039354, issued on May 10, 2021.
Supplementary European Search Report in the European application No. 21160521.7, mailed on May 26, 2021.
First Office Action of the Taiwanese application No. 107109450, issued on May 18, 2021.
International Search Report in the international application No. PCT/CN2017/078049, mailed on Dec. 14, 2017.
Written Opinion of the International Search Authority in the international application No. PCT/CN2017/078049, mailed on Dec. 14, 2017.
First Office Action of the Philippine application No. 12019502152, issued on May 6, 2025, 6 pages.
Office Action of the Australian application No. 2017405486, issued on Mar. 21, 2022.
First Office Action of the U.S. Appl. No. 16/496,098, issued on Apr. 19, 2021.
Final Office Action of the U.S. Appl. No. 16/496,098, issued on Aug. 23, 2021.
Advisory Action of the U.S. Appl. No. 16/496,098, issued on Nov. 16, 2021.
Notice of Allowance of the U.S. Appl. No. 16/496,098, issued on Dec. 17, 2021.
Notice of Supplementary Allowance of the U.S. Appl. No. 16/496,098, issued on Mar. 3, 2022.
Notice of Rejection of the Japanese application No. 2019-552080, issued on Nov. 26, 2021.
First Office Action of the Indonesian application No. P00201909508, issued on Feb. 3, 2022.
First Office Action of the Israeli application No. 269514, issued on Dec. 19, 2021.
First Office Action of the Japanese application No. 2022-037928, issued on Jun. 30, 2023. 10 pages with English translation.
First Office Action of the Chinese application No. 201780088283.1, issued on Aug. 3, 2023. 14 pages with English translation.
MCC Support, "Final Report of 3GPP TSG RAN WG1 #88 v1.0.0" (Athens, Greece, Feb. 13-17, 2017), 3GPP TSG RAN WG1 Meeting #88bis R1-1704172, Spokane, USA, Apr. 3-7, 2017.
First Office Action of the Korean application No. 10-2019-7027471, issued on Dec. 10, 2020.
First Office Action of the Canadian application No. 3056952, issued on Dec. 4, 2020.
Written Opinion of the Singaporean application No. 11201908850U, issued on Nov. 4, 2020.

(56)         References Cited

OTHER PUBLICATIONS

Qualcomm Incorporated, "Synchronization signal bandwidth and multiplexing consideration" 3GPP TSG-RAN WG1 NR #88 R1-1702584, Feb. 13-17, 2017 Athens, Greece.
Qualcomm, "Mini-slot design for mmW" 3GPP TSG RAN WG1 Meeting #87, R1-1612015, Reno, USA, Nov. 14-18, 2016.
First Office Action of the Brazilian application No. BR1120190196722, issued on Jan. 2, 2024. 8 pages with English translation.
Notice of Allowance of the U.S. Appl. No. 17/713,984, issued on Nov. 14, 2023. 46 pages.
Supplemental Notice of Allowance of the U.S. Appl. No. 17/713,984, issued on Jan. 8, 2024. 6 pages.
Samsung Electronics, "Narrowband LTE Downlink Design", 3GPP TSG GERAN#67, GP-150687, Aug. 10-14, 2015.
First Office Action of the Chinese application No. 201911328210.2, issued on Dec. 2, 2022.

* cited by examiner

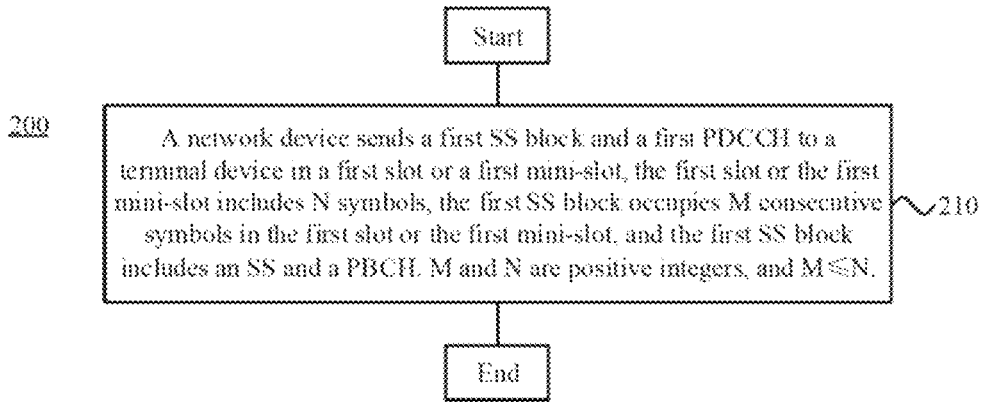
200
FIG. 13
FIG. 14
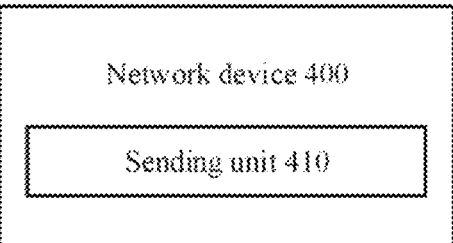
FIG. 15

INFORMATION TRANSMISSION METHOD, TERMINAL DEVICE, AND NETWORK DEVICE

CROSS-REFERENCE TO RELATED APPLICATIONS

This is a continuation application of U.S. patent application Ser. No. 17/713,984 filed on Apr. 5, 2022, which is a continuation of U.S. patent application Ser. No. 16/496,098 filed on Sep. 20, 2019, which is a continuation of International Patent Application No. PCT/CN2017/078049 filed on Mar. 24, 2017, the disclosures of which are hereby incorporated by reference in their entirety.

TECHNICAL FIELD

The embodiments of the disclosure relates to the field of communication, and in particular to a method, a terminal device and a network device for information transmission.

BACKGROUND

In a Long Term Evolution (LTE) system, a time domain position of a Physical Downlink Control Channel (PDCCH) is completely fixed and located on the first several symbols (max. 3) of each sub-frame of 1 ms. A Synchronization Signal (SS) and a Physical Broadcast Channel (PBCH) of LTE Frequency Division Duplexing (FDD) are respectively in different slots of one sub-frame. In a New Radio (NR) system, a multi-beam technology is introduced in a high-frequency band, that is, a network device alternatively sends signals of multiple beams in a Time Division Duplexing (TDD) manner, so the signals are sent only on some beams in each time unit to concentrate energy and expand coverage. According to the existing research on NR, each beam transmits the SS and the PBCH in one SS block, and the SS block is at the central portion of a system bandwidth. Therefore, the network resource utilization of the existing NR solution is low.

SUMMARY

In view of this, the disclosure provides a method, a terminal device and a network device for information transmission, which may achieve efficient multiplexing of SSs, Physical Broadcast Channels (PBCHs) and PDCCHs while meeting the transmission requirements of the NR high-frequency band, thereby reducing control signaling overheads and terminal complexity, and improving resource utilization and flexibility of a communication system.

A first aspect provides a method for information transmission. The method may include the following operation. A terminal device receives, in a first slot or a first mini-slot, a first SS block and a first PDCCH sent by a network device. The first slot or the first mini-slot includes N symbols. The first SS block occupies M consecutive symbols in the first slot or the first mini-slot. The first SS block includes an SS and a PBCH. M and N are positive integers, and M≤N.

In at least one embodiment, the terminal device may also receive the first SS block and the first PDCCH in a sub-frame or other time domain scheduling units. One time domain scheduling unit may include multiple sub-carriers or the whole system bandwidth in the frequency domain.

In an NR system, one SS block adopts one beam. Different SS blocks adopt different beams.

In at least one embodiment, the first SS block may also occupy multiple discrete symbols in one time domain scheduling unit.

In a possible implementation mode, the symbols occupied by the first PDCCH are at least partially overlapped with the symbols occupied by the first SS block, and frequency domain resources occupied by the first PDCCH are non-overlapped with frequency domain resources occupied by the first SS block do not overlap.

In a possible implementation mode, the first SS block occupies a first symbol to an Mth symbol of the first slot or the first mini-slot.

A downlink time domain scheduling unit of this structure may enable a terminal to read immediately the PDCCH and system information of the present domain scheduling unit after the terminal completes cell search. Therefore, the accessing time of the terminal to a network can be shortened, and power consumption of the terminal accessing the network is saved.

In at least one embodiment, the first SS block may occupy the middle M consecutive symbols of the first slot or the first mini-slot.

In a possible implementation mode, the first PDCCH occupies the first symbol to a Pth symbol of the first slot or the first mini-slot, and the first PDCCH is located on at least one side of a bandwidth of the first SS block in the frequency domain. P is a positive integer, and P≤M.

In a possible implementation mode, the symbols occupied by the first PDCCH are non-overlapped with the symbols occupied by the first SS block.

In a possible implementation mode, the first SS block occupies an (N−M+1)th symbol to an Nth symbol of the first slot or the first mini-slot, and the first PDCCH occupies the first symbol to a Pth symbol of the first slot or the first mini-slot. P is a positive integer, and P≤(N−M).

In a possible implementation mode, the method further includes the following operation. The terminal device receives, in a second slot or a second mini-slot, a second PDCCH sent by the network device. The second slot or the second mini-slot includes no SS block. The position of the second PDCCH in the second slot or the second mini-slot is the same as the position of the first PDCCH in the first slot or the first mini-slot.

For the downlink time domain scheduling unit of this structure, the position of the PDCCH in the time domain scheduling unit including the SS block is the same as the position of the PDCCH in the time domain scheduling unit including no SS block, which keeps the simple structure of the PDCCH. Therefore, extra signaling for configuring the position of the PDCCH may be avoided, signaling overhead is reduced, and the complexity of the terminal device and the network device is simplified.

In a possible implementation mode, the method further includes the following operation. The terminal device receives, in a second slot or a second mini-slot, a second PDCCH sent by the network device. The second slot or the second mini-slot includes no SS block. The position of the second PDCCH in the second slot or the second mini-slot is different from the position of the first PDCCH in the first slot or the first mini-slot.

In a possible implementation mode, the method further includes the following operation. The terminal device receives first indication information and second indication information. The first indication information is configured for indicating the position of the first PDCCH in the first slot or the first mini-slot, and the second indication information is configured for indicating the position of the second PDCCH in the second slot or the second mini-slot. The terminal device determines the position of the first PDCCH in the first slot or the first mini-slot and the position of the second PDCCH in the second slot or the second mini-slot according to the first indication information and the second indication information.

In a possible implementation mode, at least one of the first indication information or the second indication information is carried in a PBCH or a system message.

In a possible implementation mode, the first PDCCH is configured for scheduling at least one of the following physical downlink data channels: a physical downlink data channel in the first slot or the first mini-slot, a physical downlink data channel in at least one slot or mini-slot after the first slot or the first mini-slot, or a physical downlink data channel in at least one slot or mini-slot prior to the first slot or the first mini-slot.

The PDCCH may not only schedule the physical downlink data channel in the present time domain scheduling unit, but also schedule the physical downlink data channel in a time domain scheduling unit prior to or after the present time domain scheduling unit, such that the flexibility of resource scheduling is further improved, thereby providing a better adaption to the change of beam user capacity and service load.

In a possible implementation mode, downlink control information carried on the first PDCCH is configured for indicating that the physical downlink data channel scheduled by the first PDCCH is in at least one slot or mini-slot prior to the first slot or the first mini-slot. The method further includes the following operations. The terminal device receives third indication information. The third indication information is configured for indicating positions of physical downlink data channels, capable of being scheduled by the first PDCCH, in the at least one slot or mini-slot. The terminal device caches, according to the indication information, data carried on the physical downlink data channels, capable of being scheduled by the first PDCCH, in the at least one slot or mini-slot. The terminal device acquires, according to the first PDCCH, data corresponding to the first PDCCH from the data cached by the terminal device and carried on the physical downlink data channel, capable of being scheduled by the first PDCCH, in the at least one slot or mini-slot.

In a possible implementation mode, the third indication information is carried in Radio Resource Control (RRC) signaling.

In a possible implementation mode, the method further includes the following operation. The terminal device receives, in a third slot or a third mini-slot, a second SS block and a third PDCCH sent by the network device. The second SS block includes an SS and a PDCCH. The first SS block is different from the second SS block.

In a possible implementation mode, the first slot or the first mini-slot and the third slot or the third mini-slot are consecutively scheduled by the network device.

The time domain scheduling unit including the SS block is continuously transmitted, thereby shortening the time that the terminal searches the SS and reads the PBCH, and saving the power consumption of the terminal.

A second aspect provides a method for information transmission. The method may include the following operation. The network device sends a first SS block and a first PDCCH to the terminal device in a first slot or a first mini-slot. The first slot or the first mini-slot includes N symbols. The first SS block occupies M consecutive symbols in the first slot or the first mini-slot. The first SS block includes an SS and a PBCH. M and N are positive integers, and M≤N.

In a possible implementation mode, the symbols occupied by the first PDCCH are at least partially overlapped with the symbols occupied by the first SS block. The frequency domain resources occupied by the first PDCCH are non-overlapped with the frequency domain resources occupied by the first SS block.

In a possible implementation mode, the first SS block occupies a first symbol to an Mth symbol of the first slot or the first mini-slot.

In a possible implementation mode, the first PDCCH occupies the first symbol to a Pth symbol of the first slot or the first mini-slot, and the first PDCCH is located on at least one side of a bandwidth of the first SS block in the frequency domain. P is a positive integer, and P≤M.

In a possible implementation mode, the symbols occupied by the first PDCCH are non-overlapped with the symbols occupied by the first SS block.

In a possible implementation mode, the first SS block occupies an (N−M+1)th symbol to an Nth symbol of the first slot or the first mini-slot, and the first PDCCH occupies a first symbol to a Pth symbol of the first slot or mini-slot. P is a positive integer, and P≤(N−M).

In a possible implementation mode, the method further includes the following operation. The network device sends a second PDCCH to the terminal device in a second slot or a second mini-slot. The second slot or the second mini-slot includes no SS block. The position of the second PDCCH in the second slot or the second mini-slot is the same as the position of the first PDCCH in the first slot or the first mini-slot.

In a possible implementation mode, the method further includes the following operation. The network device sends a second PDCCH to the terminal device in a second slot or a second mini-slot. The second slot or the second mini-slot includes no SS block. The position of the second PDCCH in the second slot or the second mini-slot is different from the position of the first PDCCH in the first slot or the first mini-slot.

In a possible implementation mode, the method further includes the following operation. The network device sends first indication information and second indication information to the terminal device. The first indication information is configured for indicating the position of the first PDCCH in the first slot or the first mini-slot, and the second indication information is configured for indicating the position of the second PDCCH in the second slot or the second mini-slot.

In a possible implementation mode, at least one of the first indication information or the second indication information is carried in a PBCH or a system message.

In a possible implementation mode, the first PDCCH is configured for scheduling at least one of the following physical downlink data channels: a physical downlink data channel in the first slot or the first mini-slot, a physical downlink data channel in at least one slot or the first mini-slot after the first slot or mini-slot, or a physical downlink data channel in at least one slot or mini-slot prior to the first slot or the first mini-slot.

In a possible implementation mode, downlink control information carried on the first PDCCH is configured for indicating that the physical downlink data channel scheduled by the first PDCCH is in at least one slot or mini-slot prior to the first slot or the first mini-slot. The method further includes the following operation. The network device sends third indication information to the terminal device. The third indication information is configured for indicating positions of physical downlink data channels, capable of being scheduled by the first PDCCH, in the at least one slot or mini-slot.

In a possible implementation mode, the third indication information is carried in RRC signaling.

In a possible implementation mode, the method further includes the following operation. The network device sends a second SS block and a third PDCCH to the terminal device in a third slot or a third mini-slot. The second SS block includes an SS and a PDCCH. The first SS block is different from the second SS block.

In a possible implementation mode, the first slot or the first mini-slot and the third slot or the third mini-slot are consecutively scheduled by the network device.

A third aspect provides a terminal device, which is configured to execute the method in the first aspect or any possible implementation mode of the first aspect. Specifically, the terminal device includes units configured to execute the method in the first aspect or any possible implementation mode of the first aspect.

A fourth aspect provides a network device, which is configured to execute the method in the second aspect or any possible implementation mode of the second aspect. Specifically, the network device includes units configured to execute the method in the second aspect or any possible implementation mode of the second aspect.

A fifth aspect provides a terminal device, which includes a memory, a processor, an input interface and an output interface. The memory, the processor, the input interface and the output interface are connected through a bus system. The memory is configured to store an instruction. The processor is configured to execute the instruction stored in the memory to execute the method in the first aspect or any possible implementation mode of the first aspect.

A sixth aspect provides a network device, which includes a memory, a processor, an input interface and an output interface. The memory, the processor, the input interface and the output interface are connected through a bus system. The memory is configured to store an instruction. The processor is configured to execute the instruction stored in the memory to execute the method in the second aspect or any possible implementation mode of the second aspect.

A seventh aspect provides a computer storage medium, which is configured to store a computer software instruction to execute the method in the first aspect or any possible implementation mode of the first aspect, or the method in the second aspect or any possible implementation mode of the second aspect, and includes a program configured to execute the above aspects.

These aspects or other aspects of the disclosure will become apparent through the following descriptions of the embodiments.

BRIEF DESCRIPTION DRAWINGS

FIG. 13 illustrates another schematic block diagram of the method for information transmission according to an embodiment of the disclosure.

FIG. 14 illustrates a schematic block diagram of a terminal device for information transmission according to an embodiment of the disclosure.

FIG. 15 illustrates a schematic block diagram of a network device for information transmission according to an embodiment of the disclosure.

DETAILED DESCRIPTION

Figure 1:
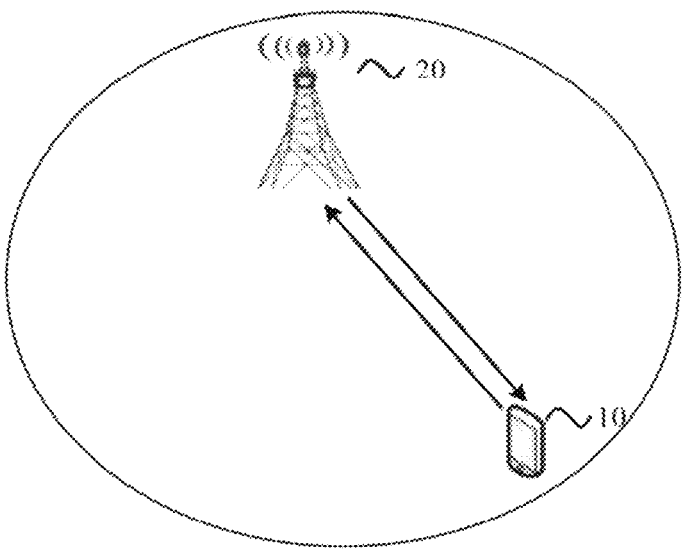
FIG. 1 illustrates a schematic diagram of an application scenario according to an embodiment of the disclosure.

The technical solutions in the embodiments of the disclosure will be clearly and completely described below in combination with the drawings in this embodiment of the disclosure.

It is to be understood that the technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD), a Universal Mobile Telecommunication System (UMTS), a Worldwide Interoperability for Microwave Access (WiMAX) communication system or a future 5G system.

Particularly, the technical solutions of the embodiments of the disclosure may be applied to various nonorthogonal multiple access technology-based communication systems, for example, a Sparse Code Multiple Access (SCMA) system and a Low Density Signature (LDS) system. The SCMA system and the LDS system may also have other names in the field of communication. Furthermore, the technical solutions of the embodiments of the disclosure may be applied to multi-carrier transmission systems adopting nonorthogonal multiple access technologies, for example, Orthogonal Frequency Division Multiplexing (OFDM), Filter Bank Multi-Carrier (FBMC), Generalized Frequency Division Multiplexing (GFDM) and Filtered-OFDM (F-OFDM) systems adopting the nonorthogonal multiple access technologies.

In the embodiments of the disclosure, a terminal device may represent User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, a terminal device in a future 5G network, a terminal device in a future evolved Public Land Mobile Network (PLMN) or the like. There are no limits made in this embodiment of the disclosure.

In the embodiments of the disclosure, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. Alternatively, the network device may be a relay station, an access point, a vehicle-mounted device, a wearable device, a network device in the future 5G network, a network device in the future evolved PLMN or the like. There are no limits made in this embodiment of the disclosure.

FIG. 1 is a schematic diagram of an application scenario according to an embodiment of the disclosure. A communication system in FIG. 1 may include a terminal device 10 and a network device 20. The network device 20 is configured to provide a communication service for the terminal device 10 for access to a core network. The terminal device 10 searches a synchronous signal, broadcast signal and the like sent by the network device 20 to access the network, thereby communicating with the network. Arrows illustrated in FIG. 1 may represent uplink/downlink transmission implemented through a cellular link between the terminal device 10 and the network device 20.

In the LTE system, a time domain position of a PDCCH is completely fixed and located on the first several symbols (max. 3) of each sub-frame of 1 ms. An SS of the LTE FDD is at the tail of the previous slot of a sub-frame, and a PBCH is at the head of the next slot of the sub-frame. A Primary Synchronization Signal (PSS) and a Secondary Synchronization Signal (SSS) of the LTE TDD are in different slots and different sub-frames, which are respectively at the tail of one slot and at the third symbol of one slot. The PBCH is also at the head of one slot.

In the 5G system, it is necessary to support data transmission performed on a high-frequency band (of which the center frequency is more than 6 GHz, typically for example, 28 GHz), so as to meet the requirement for a transmission rate in 5G. When the data transmission is performed on the high-frequency band, a Multiple Input Multiple Output (MIMO) technology is adopted to achieve a higher transmission rate. Adopting the MIMO technology at a high frequency has a high requirement on a Radio Frequency (RF) device of an antenna, and the hardware cost (for example, an Analog/Digital (A/D) converter and a Digital/Analog (D/A) converter) of the antenna is greatly increased. For reducing the cost, a hybrid beamforming manner is usually adopted on the high-frequency band to reduce the number of RF transceiving units. An antenna array including a large number of antennas is adopted, so a narrower beam with better directionality may be generated, and signals are only sent on some beams in each time unit, which may concentrate energy and expand coverage.

For facilitating understanding, a basic communication process between the terminal device and the network device is briefly described. Specifically, after being powered on, the terminal device receives the PSS and the SSS at several center frequency points of a possible cell to achieve frame synchronization, and then may read the PBCH. The system information such as a system bandwidth, Physical Hybrid ARQ Indicator Channel (PHICH) resources, the number of antennas or a system frame number may be acquired from the PBCH. The terminal device may also carry some other information into the system information, camp on and use various services provided by the network device. When the network device has downlink data to be sent to a certain terminal device, the network device first sends a downlink control channel to the terminal device, so as to mainly inform the terminal device of the position of the Physical Downlink Shared Channel (PDSCH) allocated for the downlink data in a resource grid, and then sends the PDSCH to the terminal device at the position assigned for the terminal device.

Figure 2:
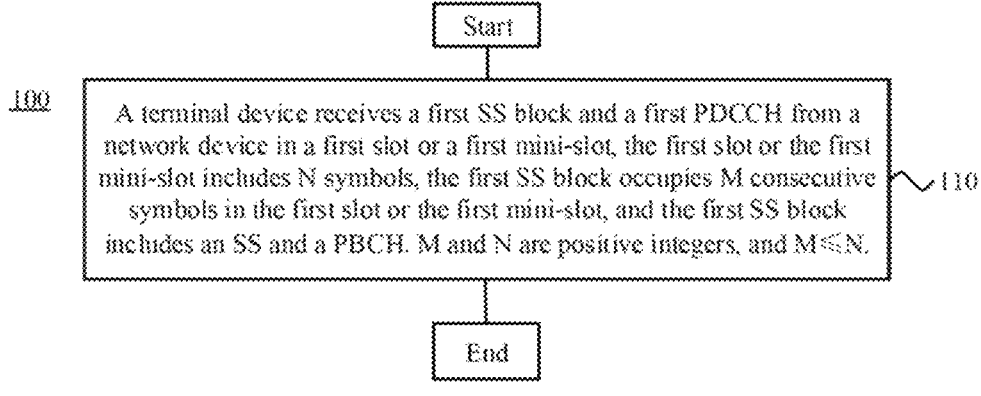
FIG. 2 illustrates a schematic block diagram of a method for information transmission according to an embodiment of the disclosure.

FIG. 2 illustrates a schematic block diagram of a method 100 for information transmission according to an embodiment of the disclosure. As illustrated in FIG. 2, the method 100 includes the following operation.

At S110, a terminal device receives a first SS block and a first PDCCH from a network device in a first slot or a first mini-slot. The first slot or the first mini-slot includes N symbols, the first SS block occupies M consecutive symbols in the first slot or the first mini-slot, and the first SS block includes an SS and a PBCH. M and N are positive integers, and M≤N.

First, the first slot or the first mini-slot is a time domain scheduling unit, and may be a sub-frame or other units of length in the disclosure. One time domain scheduling unit may include multiple symbols in the time domain, and include multiple sub-carriers or the whole system bandwidth in the frequency domain. Second, in an NR system, the SS and the PBCH of each beam are transmitted in one SS block, and the SS blocks of multiple beams are combined into an SS burst. In other words, different SS blocks adopt different beams.

Specifically, a part of resources may be allocated in the time domain scheduling unit including the SS block to transmit the PDCCH. As described above, in the LTE system, the PDCCH is located in the first several symbols of a sub-frame, while the SS and the PBCH are located in different slots and on 72 sub-carriers at the center of the system bandwidth in the frequency domain. In the NR system, the time domain scheduling unit is not a sub-frame, but may be a slot or a mini-slot, and the system bandwidth will get larger. If configuration of the time domain scheduling unit in the LTE system is still adopted, other frequency domain positions in the time domain scheduling unit including the SS are wasted. If a part of resources are allocated in the time domain scheduling unit transmitting the SS block to transmit the downlink control channel, the resource utilization may be improved, the transmission time for each beam may be shortened, a transmission latency may be reduced, and more beams may be accommodated while the coverage requirement of the NR high-frequency band is met, thereby improving capacity and coverage of a communication system.

In at least one embodiment of the disclosure, the method 100 may further include the following operation.

At S120, the terminal device determines the network device or implements synchronization with the network device according to the first SS block, and the terminal device may also schedule a physical downlink data channel corresponding to the first PDCCH according to the first PDCCH.

In at least one embodiment, when there are other resources not allocated in the first slot or the first mini-slot, the other resources may be configured to transmit the physical downlink data channel. In such a manner, transmission resources of the data channels under the beam may be expanded, that is, if a data volume is small, it is not necessary to allocate a new slot or mini-slot for the terminal device under the beam. Meanwhile, transmission time of a beam may be shortened, and more beams may be accommodated in unit time, thereby improving capacity and coverage of a communication system.

In at least one embodiment of the disclosure, the symbols occupied by the first PDCCH are at least partially overlapped with the symbols occupied by the first SS block, and the frequency domain resources occupied by the first PDCCH are non-overlapped with frequency domain resources occupied by the first SS block.

Furthermore, the first SS block occupies the first symbol to the Mth symbol of the first slot or the first mini-slot. The first PDCCH occupies the first symbol to the Pth symbol of the first slot or the first mini-slot, and the first PDCCH is located on at least one side of the bandwidth of the first SS block in the frequency domain. P is a positive integer, and $P \leq M$.

In at least one embodiment, the first SS block and the first PDCCH may overlap partially or completely in the time domain. For example, the first SS block occupies the first M symbols, the first PDCCH is on the side of the bandwidth of the first SS block and also occupies the first M symbols of the first slot or the first mini-slot, and may also occupy the first P symbols, $P \geq M$.

The first SS block is configured on the first several symbols of the first slot or the first mini-slot to be transmitted, which enables the terminal to read immediately the downlink control channel and system information of the present slot after completing cell search. Therefore, the access time of the terminal to a network may be shortened, and power consumption of the terminal during accessing the network is saved.

In at least one embodiment, the first PDCCH may be configured on the middle several consecutive symbols or the last several consecutive symbols of the first slot or the second mini-slot. The first PDCCH is merely required to be overlapped or partially overlapped with the first SS block in the time domain and to be non-overlapped with the first SS block in the frequency domain.

In at least one embodiment of the disclosure, the symbols occupied by the first PDCCH are non-overlapped with the symbols occupied by the first SS block.

Furthermore, the first SS block occupies the (N−M+1)th symbol to the Nth symbol of the first slot or the first mini-slot, and the first PDCCH occupies the first symbol to the Pth symbol of the first slot or the first mini-slot. P is a positive integer, and $P \leq (N-M)$.

In at least one embodiment, the first SS block and the first PDCCH may or may not overlap in the frequency domain. In the embodiment of the disclosure, it is only required that the first SS block and the first PDCCH do not overlap in the time domain. Specifically, the first SS block may be configured at the center of the system bandwidth of the first slot or the first mini-slot, and occupies the last several symbols of the first slot or the first mini-slot. Similarly, the first PDCCH may be configured at the center of the system bandwidth of the first slot or mini-slot, and occupies the first several symbols of the first slot or the first mini-slot.

In at least one embodiment of the disclosure, the method further includes the following operation. The terminal device receives, in a second slot or a second mini-slot, a second PDCCH sent by the network device. The second slot or the second mini-slot does not include an SS block, and the position of the second PDCCH in the second slot or the second mini-slot is the same as the position of the first PDCCH in the first slot or the first mini-slot.

For the terminal device, one terminal may correspond to one beam. When the amount of downlink data to be sent by the network device to the terminal device is large, transmission of the physical downlink data channel may be performed either in the slot or the mini-slot including an SS block, or in the slot or the mini-slot including no SS block. It should be understood that the slot or the mini-slot including no SS block, namely the second slot or the second mini-slot, may also include no PDCCH, and all the resources are used for transmission of the physical downlink data channel. The positions of the PDCCHs in the first slot or the first mini-slot and the second slot or the second mini-slot are configured the same, such that the simple structure of the control channel is kept, which can avoid extra signaling for configuring the position of the control channel, reduce the signaling overhead, and simplify the complexity of the terminal device and the network device.

Specifically, the first PDCCH and the second PDCCH may be respectively configured on the first several symbols of the first slot or the first mini-slot and on the second slot or the second mini-slot, for example, the first 3 symbols.

In at least one embodiment of the disclosure, the method further includes the following operation. The terminal device receives, in the second slot or the second mini-slot, the second PDCCH sent by the network device. The second slot or the second mini-slot does not include an SS block, and the position of the second PDCCH in the second slot or the second mini-slot is different from the position of the first PDCCH in the first slot or the first mini-slot.

It should be understood that the network device usually sends, through the PBCH or the system message, resource information for indicating a common search space of the downlink control channel to the terminal device.

When the position of the PDCCH in the first slot or the first mini-slot is different from the position of the PDCCH in the second slot or the second mini-slot, the network device sends first indication information and second indication information to the terminal device. The first indication information is used to indicate the position of the first PDCCH in the first slot or the first mini-slot, and the second indication information is used for indicating the position of the second PDCCH in the second slot or the second mini-slot. The terminal device respectively determines the position of the first PDCCH in the first slot or the first mini-slot and the position of the second PDCCH in the second slot or the second mini-slot according to the first indication information and the second indication information.

The first indication information and the second indication information may be carried in a message, and may also be sent separately.

In at least one embodiment of the disclosure, the first PDCCH is used for scheduling at least one of the following physical downlink data channels: a physical downlink data channel in the first slot or the first mini-slot, a physical downlink data channel in at least one slot or mini-slot after the first slot or the first mini-slot, or a physical downlink data channel in at least one slot or mini-slot prior to the first slot or the first mini-slot.

That is, the PDCCH in a slot or a mini-slot may schedule either a physical downlink data channel in the present slot or mini-slot or a physical downlink data channel in other slots or mini-slots. The physical downlink data channel in other slots or mini-slots may be either the physical downlink data channel in one or more slots or mini-slots prior to the present slot or mini-slot, or the physical downlink data channel in one or more slots or mini-slots after the present slot or mini-slot.

Specifically, when the first PDCCH schedules the physical downlink data channel in the slot or the mini-slot prior to the first slot or the first mini-slot, the data may be acquired in the following manner.

The terminal device receives the third indication information, and the third indication information is used for indicating positions of physical downlink data channels that can be scheduled by the first PDCCH in the at least one slot or mini-slot. The terminal device caches, according to the indication information, data carried on the physical downlink data channels that can be scheduled by the first PDCCH in the at least one slot or mini-slot. The terminal device acquires, according to the first PDCCH, the data corresponding to the first PDCCH from the data cached by the terminal device and carried on the physical downlink data channels that can be scheduled by the first PDCCH in the at least one slot or mini-slot.

In at least one embodiment, the third indication information may be carried in RRC signaling. That is, the positions of the physical downlink data channels that can scheduled by the first PDCCH in the at least one slot or mini-slot may be configured statically. The network device may not be required to send the third indication information, but directly adopts a predetermined manner. For example, when it is predetermined that the physical downlink data channel in the previous slot or mini-slot that can be scheduled by the PDCCH in the first slot or the first mini-slot includes the last two symbols of the slot or mini-slot, the terminal device may first cache the data on the two symbols. When receiving the first physical downlink data channel, the terminal device may know that the physical downlink data channel scheduled by the first PDCCH is located in the slot or mini-slot prior to the first slot or the first mini-slot, and may acquire the data corresponding to the first PDCCH from the cached data.

In at least one embodiment of the disclosure, the method further includes the following operation. The terminal device receives, in a third slot or a third mini-slot, a second SS block and a third PDCCH sent by the network device. The second SS block includes an SS and a PDCCH. The first SS block is different from the second SS block.

In at least one embodiment of the disclosure, the first slot or the first mini-slot and the third slot or the third mini-slot are consecutively scheduled by the network device.

Specifically, the terminal device may preferentially receive several slots or mini-slots including the SS blocks consecutively, and then consecutively receive the slots or mini-slots corresponding to the SS blocks and including no SS block. Different SS blocks correspond to different beams. In other words, transmission of all the slots or mini-slots including the SS blocks is performed continuously. The terminal device may consecutively receive the SS blocks, thereby saving the power consumption of the terminal.

In at least one embodiment, the slots or mini-slots including the SS blocks and the slots or mini-slots including no SS block which correspond to the same beam are transmitted continuously. All the slots or mini-slots including the SS blocks may not be transmitted continuously.

Three specific structures of the time domain scheduling unit in the embodiments of the disclosure are described below in detail in combination with FIG. 3 to FIG. 12.

In the first structure, the SS block occupies all the symbols of the time domain scheduling unit.

Figure 3:
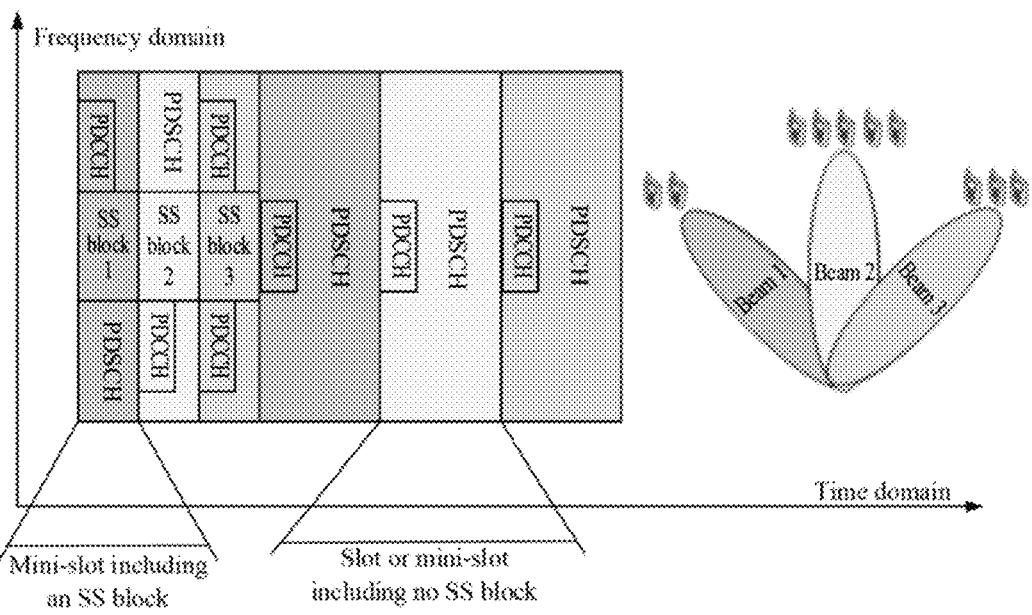
FIG. 3 illustrates a structure diagram of a downlink time domain scheduling unit according to an embodiment of the disclosure.

In embodiment 1, as illustrated in FIG. 3, the SS block is transmitted in a mini-slot with the same length as the SS block, the PDCCH and the PDSCH are transmitted on the symbols where the SS block is, and occupy the frequency domain resources on two sides of the bandwidth of the SS block. The PDCCH may be either on one side of the SS block, or on two sides. In this embodiment, the mini-slots including the SS blocks of respective beams are transmitted continuously at first, and then the mini-slots or slots including no SS block of respective beams are transmitted. The same beam may have both the time domain scheduling unit including the SS block and the time domain scheduling unit including no SS block.

Embodiment 1 is illustrated by taking that the SS block occupies the center of the system bandwidth, and the PDCCH in the time domain scheduling unit including no SS block occupies the first several symbols of the time domain scheduling unit in FIG. 3 as an example. The PDCCH in each time domain scheduling unit may also occupy the middle several consecutive symbols or the last several consecutive symbols of the time domain scheduling unit. The time domain scheduling unit including no SS block may be only used for the data transmission, and is scheduled by the PDCCH in the time domain scheduling unit including an SS block of the same beam.

Embodiment 1 has the following advantages. The terminal can read immediately the downlink control channel and system information in the present slot after the terminal completes the cell search, and the SS blocks are transmitted continuously, such that the time of searching the SS and reading the PBCH by the terminal can be shortened, the power consumption of the terminal is saved, and time-frequency resources including no SS block can be flexibly allocated.

Figure 4:
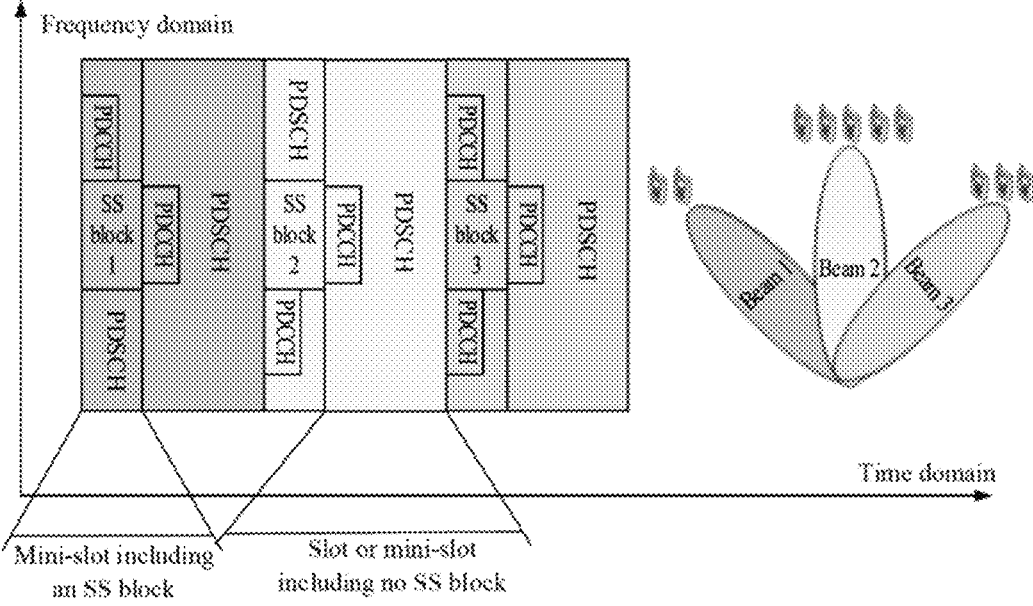
FIG. 4 illustrates another structure diagram of the downlink time domain scheduling unit according to an embodiment of the disclosure.

In embodiment 2, as illustrated in FIG. 4, the SS block is transmitted in a mini-slot with the same length as the SS block, the PDCCH and the PDSCH are transmitted on the symbols where the SS block is, and occupy the frequency domain resources on two sides of the bandwidth of the SS block. The PDCCH may be either on one side of the SS block, or on two sides. The difference between embodiment 1 and embodiment 2 is that the mini-slots including the SS blocks of respective beams are transmitted discontinuously, and the mini-slot including the SS block and the mini-slot including no SS block of a certain beam are transmitted continuously.

Embodiment 2 is illustrated by taking that the SS block occupies the center of the system bandwidth, and the PDCCH in the time domain scheduling unit including no SS block occupies the first several symbols of the time domain scheduling unit in FIG. 4 as an example. The PDCCH in each time domain scheduling unit may also occupy the middle several consecutive symbols or the last several consecutive symbols of the time domain scheduling unit. The time domain scheduling unit including no SS block may be only used for the data transmission, and is scheduled by the PDCCH in the time domain scheduling unit including the SS block of the same beam.

Embodiment 2 has the following advantages. The terminal reads immediately the downlink control channel and system information in the present slot after completing the cell search, the access speed of the terminal to a network is high, and the number of times of switching between the beams is small. Therefore, the operation complexity of the terminal device and the network device may be reduced.

In the second structure, the SS block occupies the head of the time domain scheduling unit.

Figure 5:
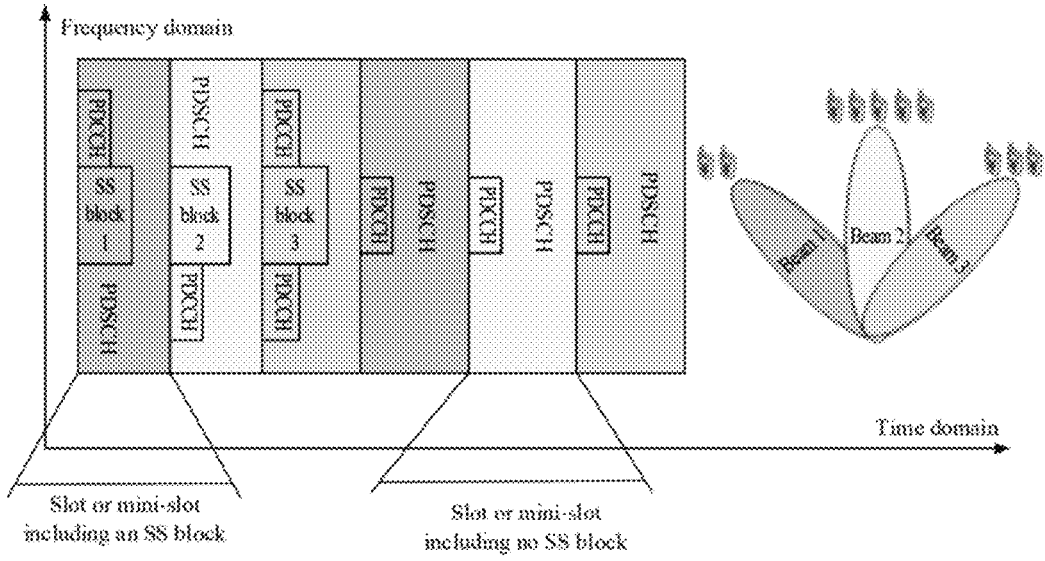
FIG. 5 illustrates yet another structure diagram of the downlink time domain scheduling unit according to an embodiment of the disclosure.

In embodiment 3, as illustrated in FIG. 5, the SS block is transmitted at the head of a slot or mini-slot with a length longer than the SS block, and the PDCCH is transmitted on the symbols where the SS block is and occupies the frequency domain resources on two sides of the bandwidth of the SS block. The PDCCH may be either on one side of the SS block, or on two sides. In the present embodiment, the slots or mini-slots including the SS blocks of respective beams are transmitted continuously at first, and then the slots or mini-slots including no SS block of respective beams are transmitted. The same beam may have both the time domain scheduling unit including the SS block and the time domain scheduling unit including no SS block.

Embodiment 3 is illustrated by taking that the SS block occupies the center of the system bandwidth, and the PDCCH in the time domain scheduling unit including no SS block occupies the first several symbols of the time domain scheduling unit in FIG. 5 as an example. The PDCCH in each time domain scheduling unit may also occupy the middle several consecutive symbols or the last several consecutive symbols of the time domain scheduling unit. It is only required that an SS block and a PDCCH in the time domain scheduling unit including the SS block overlap with each other in the time domain. The time domain scheduling unit including no SS block may be only used for the data transmission, and is scheduled by the PDCCH in the time domain scheduling unit including an SS block of the same beam.

Embodiment 3 has the following advantages. The terminal is enabled to read immediately the downlink control channel and system information in the present slot after completing the cell search, such that the access time of the terminal to a network is shortened, and the power consumption of the terminal during accessing the network is saved. Further, the slot or mini-slot including the SS block has more resources for data transmission, such that the relatively flexible resource allocation can be realized without adopting the slot or mini-slot including no SS block in many cases.

Figure 6:
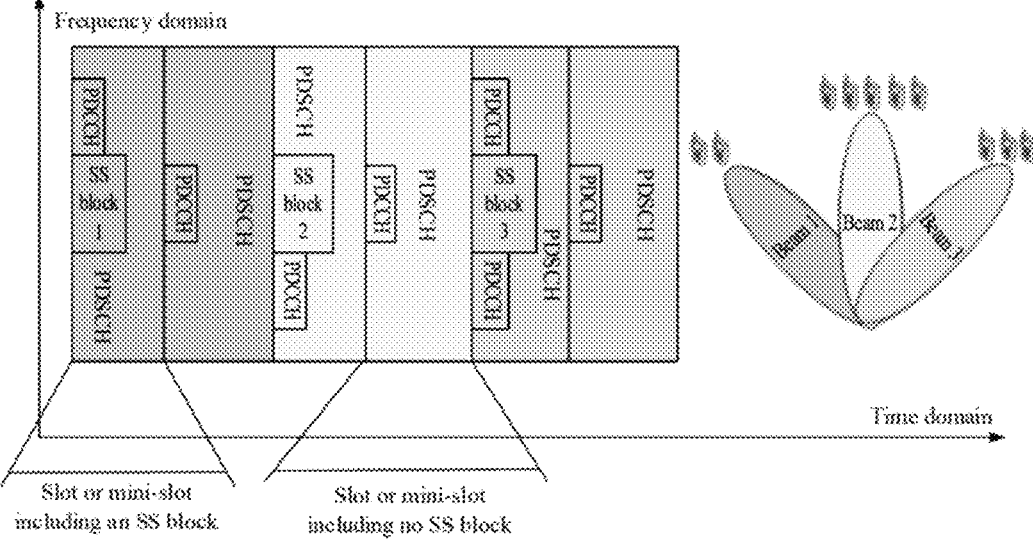
FIG. 6 illustrates yet another structure diagram of the downlink time domain scheduling unit according to an embodiment of the disclosure.

In embodiment 4, as illustrated in FIG. 6, the SS block is transmitted at the head of a slot or mini-slot with a length longer than the SS block, and the PDCCH is transmitted on the symbols where the SS block is and occupies the frequency domain resources on two sides of the bandwidth of the SS block. The PDCCH may be either on one side of the SS block, or on two sides. The difference between embodiment 4 and embodiment 3 is that the slots or mini-slots including the SS blocks of respective beams are transmitted continuously, and the slots or mini-slots including the SS block and the slots or mini-slots including no SS block of a certain beam are transmitted discontinuously.

Embodiment 4 is illustrated by taking that the SS block occupies the center of the system bandwidth, and the PDCCH in the time domain scheduling unit including no SS block occupies the first several symbols of the time domain scheduling unit in FIG. 6 as an example. The PDCCH in each time domain scheduling unit may also occupy the middle several consecutive symbols or the last several consecutive symbols of the time domain scheduling unit. It is only required that an SS block and a PDCCH in the time domain scheduling unit including the SS block overlap with each other in the time domain. The time domain scheduling unit including no SS block may be only used for the data transmission, and is scheduled by the PDCCH in the time domain scheduling unit including the SS block of the same beam.

Embodiment 4 has the following advantages. The terminal reads immediately the downlink control channel and system information in the present slot after completing the cell search, the access speed of the terminal to a network is high, the slot or mini-slot including the SS block has more resources for data transmission, and the relatively flexible resource allocation may be realized without adopting the slot or mini-slot including no SS block in many cases, and the number of times of switching between the beams is small, such that the operation complexity of the terminal device and the network device may be reduced.

Figure 7:
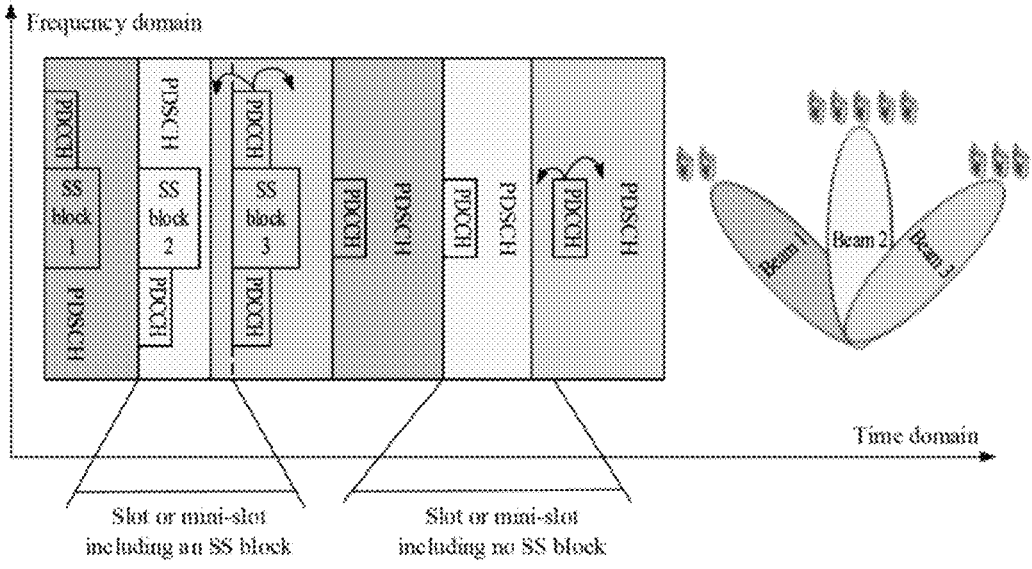
FIG. 7 illustrates yet another structure diagram of the downlink time domain scheduling unit according to an embodiment of the disclosure.

In embodiment 5, as illustrated in FIG. 7, the SS block is transmitted at the head of a slot or mini-slot with a length longer than the SS block, the PDCCH is transmitted on the symbols where the SS block is and occupies the frequency domain resources on two sides of the bandwidth of the SS block. The PDCCH may be either on one side of the SS block, or on two sides. The PDCCH in the slot or mini-slot including no SS block occupies the first several symbols of the time domain scheduling unit. The PDCCH in a slot or mini-slot including the SS block and the PDCCH in a slot or mini-slot including no SS block may schedule the PDSCH in the present slot or mini-slot, may also schedule the PDSCH after the present slot or mini-slot, and may also schedule the PDSCH prior to the present slot or mini-slot. The slots or mini-slots including SS blocks of respective beams are transmitted continuously, and the slot or mini-slot including the SS block and the slot or mini-slot including no SS block of a certain beam are transmitted discontinuously.

The PDCCH may schedule the PDSCH in other time domain scheduling units prior to the present time domain scheduling unit. The other time domain scheduling units each may or may not include an SS block. The above may be implemented in the following manner.

The network device sends first indication information to inform the terminal device of the possible case that the scheduled PDSCH is in the time domain scheduling unit prior to the PDCCH. The first indication information is transmitted by using a semi-static message, for example, RRC signaling. The first indication information is used for indicating position information of the scheduled PDSCH in the time domain scheduling unit prior to the PDCCH. The network device sends second indication information through the PDCCH to indicate that the scheduled PDSCH is within the time domain scheduling unit prior to the PDCCH.

It should be understood that the network device may also not send the first indication information to the terminal device, but directly adopts a protocol-specified manner. That is, when the network device schedules a time domain scheduling unit prior to the PDCCH, the terminal device directly caches data carried on a PDSCH in the time domain scheduling unit and specified by the protocol, when receiving the PDCCH sent by the network device, the terminal device may acquire the data corresponding to the PDCCH from the cached data.

The embodiment 5 further improves the flexibility of resource scheduling. The PDCCH may schedule the resources of the present slot or mini-slot and the resources of the slot or mini-slot after the present slot or mini-slot, and may also schedule a part of resources of the slot or mini-slot prior to the present slot or mini-slot. In such a manner, the PDSCH transmission resource of the beam may be expanded without the need of allocating a new slot or mini-slot for the beam.

Figure 8:
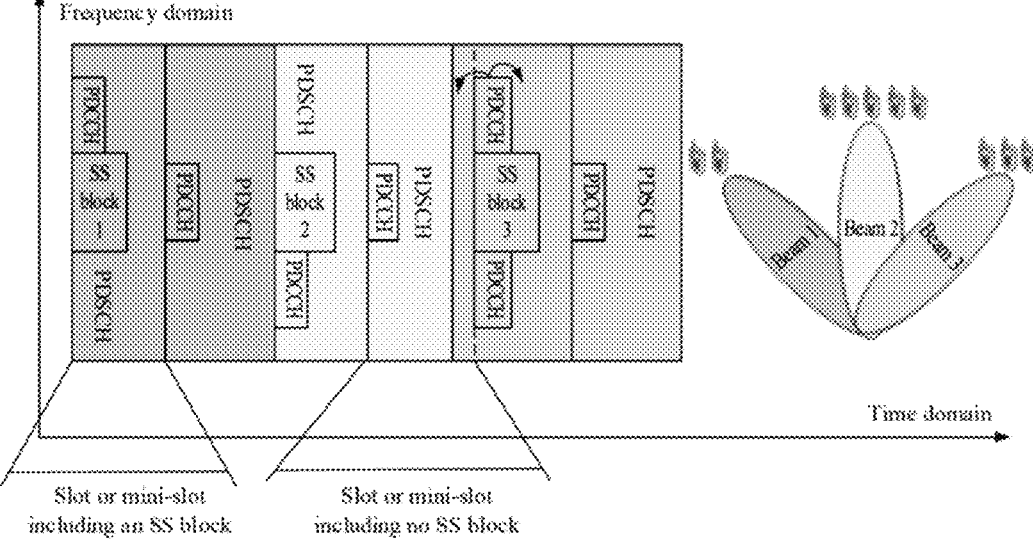
FIG. 8 illustrates yet another structure diagram of the downlink time domain scheduling unit according to an embodiment of the disclosure.

In embodiment 6, as illustrated in FIG. 8, the SS block is transmitted at the head of a slot or mini-slot with a length longer than the SS block, the PDCCH is transmitted on the symbols where the SS block is, and occupies the frequency domain resources on two sides of the bandwidth of the SS block. The PDCCH may be either on one side of the SS block, or on two sides. The PDCCH in the slot or mini-slot including no SS block occupies the first several symbols of the time domain scheduling unit. The PDCCH in a slot or mini-slot including the SS block and the PDCCH in a slot or mini-slot including no SS block may schedule the PDSCH in the present slot or mini-slot, may also schedule the PDSCH after the present slot or mini-slot, and may also schedule the PDSCH prior to the present slot or mini-slot. The slots or mini-slots including SS blocks of respective beams are transmitted discontinuously, and the slot or mini-slot including the SS block and the slot or mini-slot including no SS block of a certain beam are transmitted continuously.

Similarly, the embodiment 6 further improves the flexibility of resource scheduling. The PDCCH may schedule the resources of the present slot or mini-slot and the resources of the slot or mini-slot after the present slot or mini-slot, and may also schedule a part of resources of the slot or mini-slot prior to the present slot or mini-slot. In such a manner, the PDSCH transmission resource of the beam may be expanded without the need of allocating a new slot or mini-slot for the beam.

In the third structure, the SS block is at the tail of the time domain scheduling unit.

Figure 9:
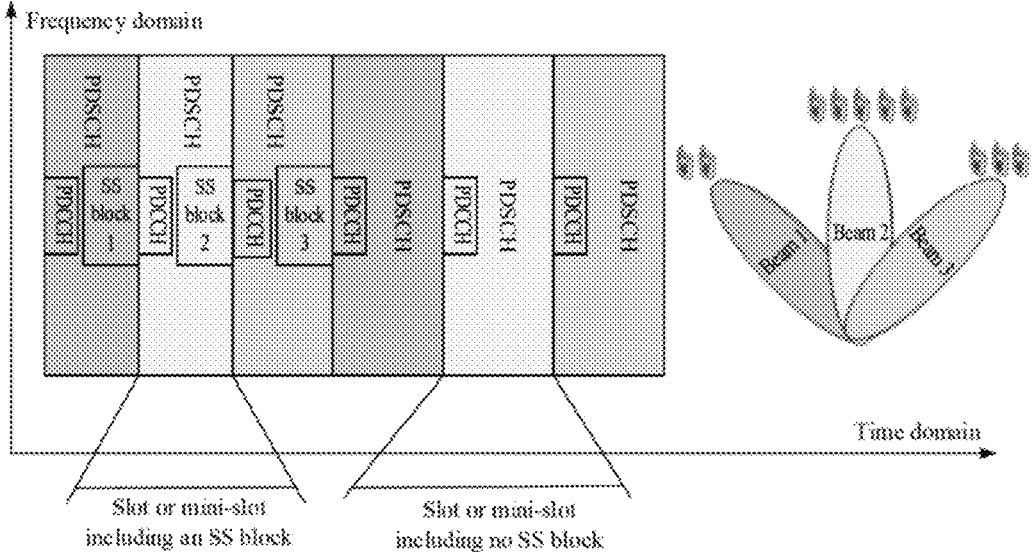
FIG. 9 illustrates yet another structure diagram of the downlink time domain scheduling unit according to an embodiment of the disclosure.

In embodiment 7, as illustrated in FIG. 9, the SS block is transmitted at the tail of a slot or mini-slot with a length longer than the SS block, the PDCCH is transmitted at the head of the slot or mini-slot, and the SS block and the PDCCH occupy different symbols. In the present embodiment, the slots or mini-slots including SS blocks of respective beams are transmitted continuously at first, and then the slots or mini-slots including no SS block of respective beams are transmitted.

It should be understood that the position of the PDCCH in the time domain scheduling unit including the SS block and the position of the PDCCH in the time domain scheduling unit including no SS block may be the same or different, and the present embodiment is described by taking that they are the same as an example. Some extensions of the above embodiments are also applied to the present embodiment, which will not be elaborated herein for simplicity.

Embodiment 7 has the following advantages. The PDCCH and the SS block are transmitted on different symbols, so the frequency domain resources of the PDCCH are not influenced by the SS, and the PDCCHs in the slot or mini-slot including the SS block and the slot or mini-slot including no SS block may adopt the same structure, thereby reducing the complexity of the network device and the terminal device, and saving the signaling overhead.

Figure 10:
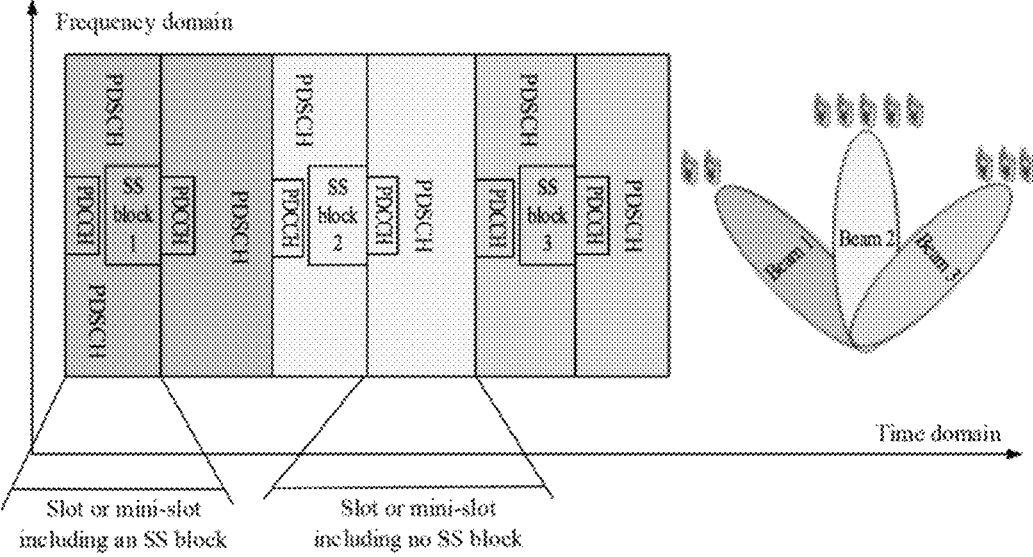
FIG. 10 illustrates yet another structure diagram of the downlink time domain scheduling unit according to an embodiment of the disclosure.

In embodiment 8, as illustrated in FIG. 10, the SS block is transmitted at the tail of a slot or mini-slot with a length longer than the SS block, the PDCCH is transmitted at the head of the slot or mini-slot, and the SS block and the PDCCH occupy different symbols. The difference between embodiment 8 and embodiment 7 is that the slots or mini-slots including SS blocks of respective beams are transmitted discontinuously, and the slot or mini-slot including the SS block and the slot or mini-slot including no SS block of a certain beam are transmitted continuously.

Embodiment 8 has the following advantages. The number of times of switching between the beams is small, and the PDCCHs in the slot or mini-slot including the SS block and the slot or mini-slot including no SS block may adopt the same structure, thereby reducing the complexity of the network device and the terminal device, and saving the signaling overhead.

Figure 11:
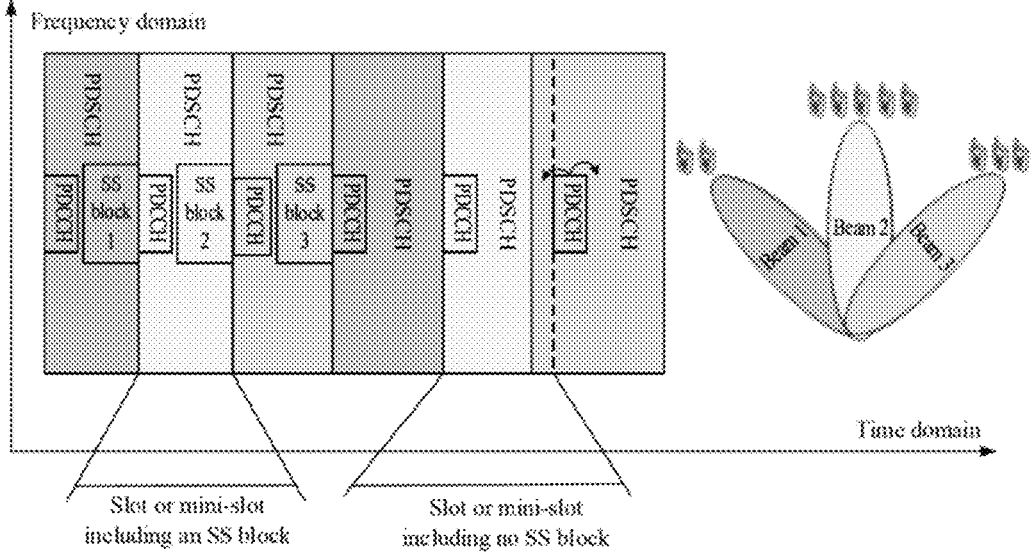
FIG. 11 illustrates yet another structure diagram of the downlink time domain scheduling unit according to an embodiment of the disclosure.

In embodiment 9, as illustrated in FIG. 11, the SS block is transmitted at the tail of a slot or mini-slot with a length longer than the SS block, the PDCCH is transmitted at the head of the slot or mini-slot, and the SS block and the PDCCH occupy different symbols. In the present embodiment, the slots or mini-slots including the SS blocks of respective beams are transmitted continuously at first, and then the slots or mini-slots including no SS block of respective beams are transmitted. The PDCCH in the slot or mini-slot including no SS block may schedule the PDSCH in the present slot or mini-slot, may also schedule the PDSCH after the present slot or mini-slot, and may also schedule the PDSCH prior to the present slot or mini-slot.

Compared with the embodiment 7, the present embodiment further improves the flexibility of resource scheduling, and the PDCCH may not only schedule the resources of the present slot or mini-slot and the resources of the slot or mini-slot after the present slot or mini-slot, but also schedule a part of resources of the slot or mini-slot prior to the present slot or mini-slot. In such a manner, the PDSCH transmission resource of the beam may be expanded without allocating a new slot or mini-slot for the beam.

Figure 12:
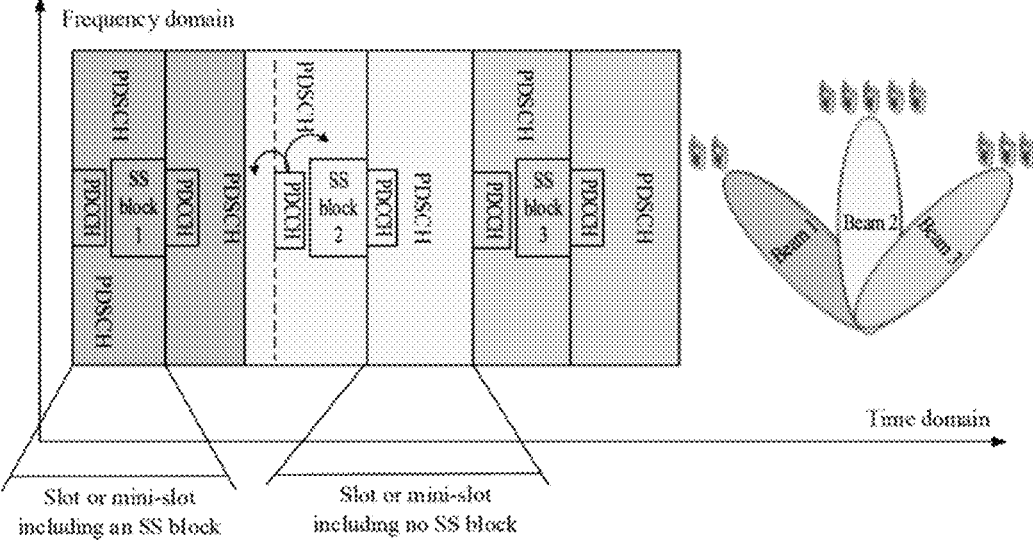
FIG. 12 illustrates yet another structure diagram of the downlink time domain scheduling unit according to an embodiment of the disclosure.

In embodiment 10, as illustrated in FIG. 12, the SS block is transmitted at the tail of a slot or mini-slot with a length longer than the SS block, the PDCCH is transmitted at the head of the slot or mini-slot, and the SS block and the PDCCH occupy different symbols. The difference between embodiment 10 and embodiment 9 is that the slots or mini-slots including SS blocks of respective beams are transmitted discontinuously, and the slot or mini-slot including the SS block and the slot or mini-slot including no SS block of a certain beam are transmitted continuously. The PDCCH in the slot or mini-slot including the SS block may schedule the PDSCH in the present slot or mini-slot, may also schedule the PDSCH after the present slot or mini-slot, and may also schedule the PDSCH prior to the present slot or mini-slot.

Compared with the embodiment 8, the present embodiment further improves the flexibility of resource scheduling, and the PDCCH may not only schedule the resources of the present slot or mini-slot and the resources of the slot or mini-slot after the present slot or mini-slot, but also schedule a part of resources of the slot or mini-slot prior to the present slot or mini-slot. In such a manner, the PDSCH transmission resource of the beam may be expanded without allocating a new slot or mini-slot for the beam.

FIG. 13 illustrates a schematic block diagram of a method 200 for information transmission according to an embodiment of the disclosure. As illustrated in FIG. 13, the method 200 includes the following operation.

At S210, a network device sends a first SS block and a first PDCCH to a terminal device in a first slot or a first mini-slot. The first slot or the first mini-slot includes N symbols, the first SS block occupies M consecutive symbols in the first slot or the first mini-slot, and the first SS block includes an SS and a PBCH. M and N are positive integers, and M≤N.

In at least one embodiment, before the operation at S210, the network device determines that the terminal device requires an establishment of communication connection with the network device, and then the network device sends the SS block to the terminal device. When the network device determines that there is data to be sent to the terminal device, the network device first sends the PDCCH to the terminal device, to indicate the position of a physical downlink data channel to the terminal device. After the operation at S210, the network device sends the physical downlink data channel to the terminal device at the corresponding position.

Therefore, the method for information transmission in this embodiment of the disclosure may improve the resource utilization while meeting the coverage requirements of the NR high-frequency band, thereby improving the flexibility of a communication system.

In at least one embodiment of the disclosure, the symbols occupied by the first PDCCH and the symbols occupied by the first SS block at least partially overlap Frequency domain resources occupied by the first PDCCH and frequency domain resources occupied by the first SS block do not overlap.

In at least one embodiment of the disclosure, the first SS block occupies the first symbol to the Mth symbol of the first slot or the first mini-slot.

In at least one embodiment of the disclosure, the first PDCCH occupies the first symbol to the Pth symbol of the first slot or the first mini-slot, and the first PDCCH is located on at least one side of the bandwidth of the first SS block in the frequency domain. P is a positive integer, and P≤M.

In at least one embodiment of the disclosure, the symbols occupied by the first PDCCH and the symbols occupied by the first SS block do not overlap.

In at least one embodiment of the disclosure, the first SS block occupies the (N−M+1)th symbol to the Nth symbol of the first slot or the first mini-slot, and the first PDCCH occupies the first symbol to the Pth symbol of the first slot or the first mini-slot. P is a positive integer, and P≤(N−M).

In at least one embodiment of the disclosure, the method further includes the following operation. The network device sends the second PDCCH to the terminal device in the second slot or the second mini-slot. The second slot or the second mini-slot includes no SS block. The position of the second PDCCH in the second slot or the second mini-slot is the same as the position of the first PDCCH in the first slot or the first mini-slot.

In at least one embodiment of the disclosure, the method further includes the following operation. The network device sends the second PDCCH to the terminal device in the second slot or the second mini-slot. The second slot or the second mini-slot includes no SS block. The position of the second PDCCH in the second slot or the second mini-slot is different from the position of the first PDCCH in the first slot or the first mini-slot.

In at least one embodiment of the disclosure, the method further includes the following operation. The network device sends first indication information and second indication information to the terminal device. The first indication information is used for indicating the position of the first PDCCH in the first slot or the first mini-slot, and the second indication information is used for indicating the position of the second PDCCH in the second slot or the second mini-slot.

In at least one embodiment of the disclosure, at least one of the first indication information or the second indication information is carried in the PBCH or a system message.

In at least one embodiment of the disclosure, the first PDCCH is used for scheduling at least one of the following physical downlink data channels: a physical downlink data channel in the first slot or the first mini-slot, a physical downlink data channel in at least one slot or mini-slot after the first slot or the first mini-slot, or a physical downlink data channel in at least one slot or mini-slot prior to the first slot or the first mini-slot.

In at least one embodiment of the disclosure, the downlink control information carried on the first PDCCH is used for indicating that the physical downlink data channel scheduled by the first PDCCH is in at least one slot or mini-slot prior to the first slot or the first mini-slot. The method further includes the following operation. The network device sends third indication information to the terminal device. The third indication information is used for indicating positions of the physical downlink data channels that can be scheduled by the first PDCCH in the at least one slot or mini-slot.

In at least one embodiment of the disclosure, the third indication information is carried in the RRC signaling.

In at least one embodiment of the disclosure, the method further includes the following operation. The network device sends the second SS block and the third PDCCH to the terminal device in a third slot or a third mini-slot. The second SS block includes an SS and a PDCCH. The first SS block is different from the second SS block.

In at least one embodiment, in this embodiment of the disclosure, the first slot or the first mini-slot and the third slot or the third mini-slot are consecutively scheduled by the network device.

It should be understood that interaction between the network device and the terminal device and related properties, functions and the like described from the network device correspond to related properties, functions and the like of the terminal device. In other words, any information sent to the network device by the terminal device will be received by the network device correspondingly. The related contents have been described, for simplicity, will not be elaborated herein.

It should be further understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

FIG. 14 illustrates a schematic block diagram of a terminal device 300 for information transmission according to an embodiment of the disclosure. As illustrated in FIG. 14, the terminal device 300 includes a receiving unit 310.

The receiving unit 310 is configured to receive, in the first slot or the first mini-slot, the first SS block and the first PDCCH sent by the network device. The first slot or the first mini-slot includes N symbols. The first SS block occupies M consecutive symbols in the first slot or the first mini-slot. The first SS block includes an SS and a PBCH. M and N are positive integers, and M≤N.

Therefore, the terminal device for information transmission in this embodiment of the disclosure may achieve efficient multiplexing of SSs, PBCHs and PDCCHs while meeting the requirements of multi-beam transmission for the NR high-frequency band, thereby reducing control signaling overheads and terminal complexity, and improving resource utilization and flexibility of a communication system.

In at least one embodiment of the disclosure, the symbols occupied by the first PDCCH are at least partially overlapped with the symbols occupied by the first SS block. The frequency domain resources occupied by the first PDCCH are non-overlapped with the frequency domain resources occupied by the first SS block.

In at least one embodiment of the disclosure, the first SS block occupies the first symbol to the Mth symbol of the first slot or the first mini-slot.

In at least one embodiment of the disclosure, the first PDCCH occupies the first symbol to the Pth symbol of the first slot or the first mini-slot, and the first PDCCH is on at least one side of the bandwidth of the first SS block in the frequency domain. P is a positive integer, and P≤M.

In at least one embodiment of the disclosure, the symbols occupied by the first PDCCH are non-overlapped with the symbols occupied by the first SS block.

In at least one embodiment of the disclosure, the first SS block occupies the (N−M+1)th symbol to the Nth symbol of the first slot or the first mini-slot, and the first PDCCH occupies the first symbol to the Pth symbol of the first slot or the first mini-slot. P is a positive integer, and P≤(N−M).

In at least one embodiment of the disclosure, the receiving unit 310 may further be configured to receive, in the second slot or the second mini-slot, the second PDCCH sent by the network device. The second slot or the second mini-slot includes no SS block. The position of the second PDCCH in the second slot or the second mini-slot is the same as the position of the first PDCCH in the first slot or the first mini-slot.

In at least one embodiment of the disclosure, the receiving unit 310 may further be configured to receive, in the second slot or the second mini-slot, the second PDCCH sent by the network device. The second slot or the second mini-slot includes no SS block. The position of the second PDCCH in the second slot or the second mini-slot is different from the position of the first PDCCH in the first slot or the first mini-slot.

In at least one embodiment of the disclosure, the receiving unit 310 may further be configured to receive the first indication information and the second indication information. The first indication information is used for indicating the position of the first PDCCH in the first slot or the first mini-slot, and the second indication information is used for indicating the position of the second PDCCH in the second slot or the second mini-slot. The terminal device 300 further includes a determining unit 320. The determining unit 320 may be configured to determine the position of the first PDCCH in the first slot or the first mini-slot and the position of the second PDCCH in the second slot or the second mini-slot according to the first indication information and the second indication information.

In at least one embodiment of the disclosure, at least one of the first indication information or the second indication information may be carried in the PBCH or the system message.

In at least one embodiment of the disclosure, the first PDCCH is used for scheduling at least one of the following physical downlink data channels: a physical downlink data channel in the first slot or the first mini-slot, a physical downlink data channel in at least one slot or mini-slot after the first slot or the first mini-slot, or a physical downlink data channel in at least one slot or mini-slot prior to the first slot or the first mini-slot.

In at least one embodiment of the disclosure, the downlink control information carried on the first PDCCH is used for indicating that the physical downlink data channel scheduled by the first PDCCH is in at least one slot or mini-slot prior to the first slot or the first mini-slot. The receiving unit 310 may further be configured to receive the third indication information. The third indication information is used for indicating the positions of the physical downlink data channels that can be scheduled by the first PDCCH in the at least one slot or mini-slot. The terminal device 300 further includes a caching unit 330 and an acquiring unit 340. The caching unit 330 may be configured to cache, according to the indication information, the data carried on the physical downlink data channels that can be scheduled by the first PDCCH in the at least one slot or mini-slot. The acquiring unit 340 may be configured to acquire, according to the first PDCCH, the data corresponding to the first PDCCH from the data cached by the terminal device and carried on the physical downlink data channels that can be scheduled by the first PDCCH in the at least one slot or mini-slot.

In at least one embodiment of the disclosure, the third indication information is carried in the RRC signaling.

In at least one embodiment of the disclosure, the receiving unit 310 may further be configured to receive, in the third slot or the third mini-slot, the second SS block and the third PDCCH sent by the network device. The second SS block includes an SS and a PDCCH. The first SS block is different from the second SS block.

In at least one embodiment of the disclosure, the first slot or the first mini-slot and the third slot or the third mini-slot are consecutively scheduled by the network device.

It is to be understood that the terminal device 300 for information transmission according to the embodiment of the disclosure may correspond to the terminal device in the method embodiments of the disclosure and the above-mentioned and other operations and/or functions of each unit in the terminal device 300 are adopted to implement the corresponding processes executed by the terminal device in the respective methods in FIG. 2 to FIG. 12, which will not be elaborated herein for simplicity.

FIG. 15 illustrates a schematic block diagram of a network device 400 for information transmission according to an embodiment of the disclosure. As illustrated in FIG. 15, the network device 400 may include a receiving unit 410.

The receiving unit 410 is configured to send the first SS block and the first PDCCH to the terminal device in the first slot or the first mini-slot. The first slot or the first mini-slot includes N symbols, the first SS block occupies M consecutive symbols in the first slot or the first mini-slot, and the first SS block includes an SS and a PBCH. M and N are positive integers, and M≤N.

Therefore, the network device for information transmission in this embodiment of the disclosure may achieve efficient multiplexing of SSs, PBCHs and PDCCHs while meeting the requirements of multi-beam transmission for the NR high-frequency band, thereby reducing control signaling overheads and terminal complexity, and improving resource utilization and flexibility of a communication system.

In at least one embodiment of the disclosure, the symbols occupied by the first PDCCH and the symbols occupied by the first SS block at least partially overlap. The frequency domain resources occupied by the first PDCCH and the frequency domain resources occupied by the first SS block do not overlap.

In a possible implementation mode, the first SS block occupies the first symbol to the Mth symbol of the first slot or the first mini-slot.

In at least one embodiment of the disclosure, the first PDCCH occupies the first symbol to the Pth symbol of the first slot or the first mini-slot, and the first PDCCH is on at least one side of the bandwidth of the first SS block in the frequency domain. P is a positive integer, and P≤M.

In at least one embodiment of the disclosure, the symbols occupied by the first PDCCH and the symbols occupied by the first SS block do not overlap.

In at least one embodiment of the disclosure, the first SS block occupies the (N−M+1)th symbol to the Nth symbol of the first slot or the first mini-slot, and the first PDCCH occupies the first symbol to the Pth symbol of the first slot or the first mini-slot. P is a positive integer, and P≤(N−M).

In at least one embodiment of the disclosure, the sending unit 410 may further be configured to send the second PDCCH to the terminal device in the second slot or the second mini-slot. The second slot or the second mini-slot does not include an SS block. The position of the second PDCCH in the second slot or the second mini-slot is the same as the position of the first PDCCH in the first slot or the first mini-slot.

In at least one embodiment of the disclosure, the sending unit 410 may further be configured to send the second PDCCH to the terminal device in the second slot or the second mini-slot. The second slot or the second mini-slot does not include an SS block. The position of the second PDCCH in the second slot or the second mini-slot is different from the position of the first PDCCH in the first slot or the first mini-slot.

In at least one embodiment of the disclosure, the sending unit 410 may further be configured to send the first indication information and the second indication information to the terminal device. The first indication information is used for indicating the position of the first PDCCH in the first slot or the first mini-slot, and the second indication information is used for indicating the position of the second PDCCH in the second slot or the second mini-slot.

In at least one embodiment of the disclosure, at least one of the first indication information or the second indication information may be carried in the PBCH or the system message.

In at least one embodiment of the disclosure, the first PDCCH is used for scheduling at least one of the following physical downlink data channels: a physical downlink data channel in the first slot or the first mini-slot, a physical downlink data channel in at least one slot or mini-slot after the first slot or the first mini-slot, or a physical downlink data channel in at least one slot or mini-slot prior to the first slot or the first mini-slot.

In at least one embodiment of the disclosure, the downlink control information carried on the first PDCCH is used for indicating that the physical downlink data channel scheduled by the first PDCCH is in at least one slot or mini-slot prior to the first slot or the first mini-slot. The sending unit 410 may further be configured to send the third indication information to the terminal device. The third indication information is used for indicating the positions of the physical downlink data channels that can be scheduled by the first PDCCH in the at least one slot or mini-slot.

In at least one embodiment of the disclosure, the third indication information may be carried in the RRC signaling.

In at least one embodiment of the disclosure, the sending unit 410 may further be configured to send the second SS block and the third PDCCH sent to the terminal device in the third slot or the third mini-slot. The second SS block includes an SS and a PDCCH. The first SS block is different from the second SS block.

In at least one embodiment of the disclosure, the first slot or the first mini-slot and the third slot or the third mini-slot may be consecutively scheduled by the network device.

It should be understood that the network device 400 for information transmission according to the embodiment of the disclosure may correspond to the network device in the method embodiments of the disclosure and the above-mentioned and other operations and/or functions of each unit in the network device 400 are adopted to implement the corresponding processes executed by the network device in the respective methods in FIG. 3 to FIG. 13, which will not be elaborated herein for simplicity.

Figure 16:
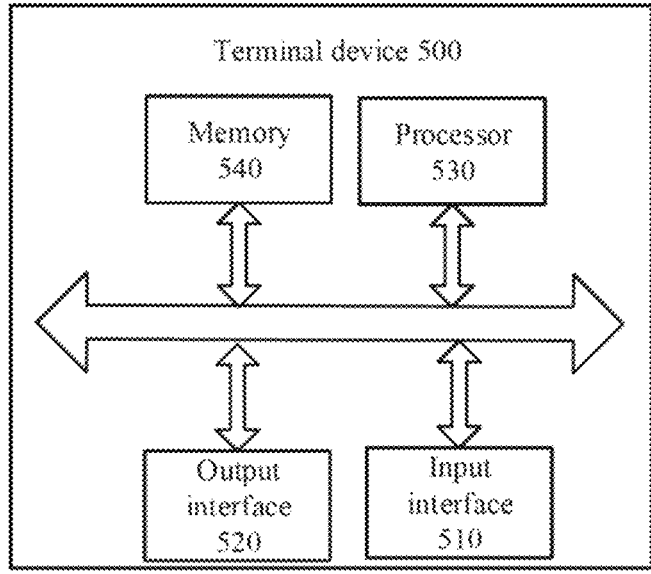
FIG. 16 illustrates another schematic block diagram of the terminal device for information transmission according to an embodiment of the disclosure.

As illustrated in FIG. 16, an embodiment of the disclosure further provides a terminal device 500 for information transmission. The terminal device 500 may be the terminal device 300 in FIG. 14, and may be configured to execute operations of the terminal device corresponding to the method 100 in FIG. 2. The terminal device 500 includes an input interface 510, an output interface 520, a processor 530 and a memory 540. The input interface 510, the output interface 520, the processor 530 and the memory 540 may be connected through a bus system. The memory 540 is configured to store a program, an instruction or a code. The processor 530 is configured to execute the program, instruction or code in the memory 540 to control the input interface 510 to receive a signal, control the output interface 520 to send a signal and complete operations in the above method embodiments.

Therefore, the terminal device for information transmission in this embodiment of the disclosure may achieve efficient multiplexing of SSs, PBCHs and PDCCHs while meeting the requirements of multi-beam transmission for the NR high-frequency band, thereby reducing control signaling overheads and terminal complexity, and improving resource utilization and flexibility of a communication system.

In this embodiment of the disclosure, the processor 530 may be a Central Processing Unit (CPU). The processor 530 may further be other universal processors, a Digital Signal Processor (DSP), an Application Specific Integrated Circuit (ASIC), a Field Programmable Gate Array (FPGA) or other programmable logic devices, discrete gates or transistor logic devices, and discrete hardware component, etc. The universal processor may be a microprocessor or the processor may also be any conventional processor, etc.

The memory 540 may include a Read Only Memory (ROM) and a Random Access Memory (RAM) and provides instructions and data for the processor 530. A part of the memory 540 may further include a nonvolatile RAM. For example, the memory 540 may further store information on a device type.

During an implementation process, the operations of the above methods may be accomplished by an integrated logic circuit of hardware in the processor 530 or an instruction in a software form. The operations of the methods disclosed in combination the embodiments of the disclosure may be directly embodied to be executed and accomplished by a hardware processor or executed and accomplished using a combination of hardware and software modules in the processor. The software module may be located in a mature storage medium in the art, such as an RAM, a flash memory, an ROM, a Programmable ROM (PROM), an Electrically EPROM (EEPROM) or a register. The storage medium is located in the memory 540. The processor 530 reads information from the memory 540 and completes the operations of the foregoing methods in combination with the hardware of the processor. In order to avoid repetition, the above will not be elaborated herein.

In a specific implementation, the receiving unit 310 in the terminal device 300 may be implemented by the input interface 510 in FIG. 16. The determining unit 320, the caching unit 330 and the acquiring unit 340 in the terminal device 300 may be implemented by the processor 530 in FIG. 16.

Figure 17:
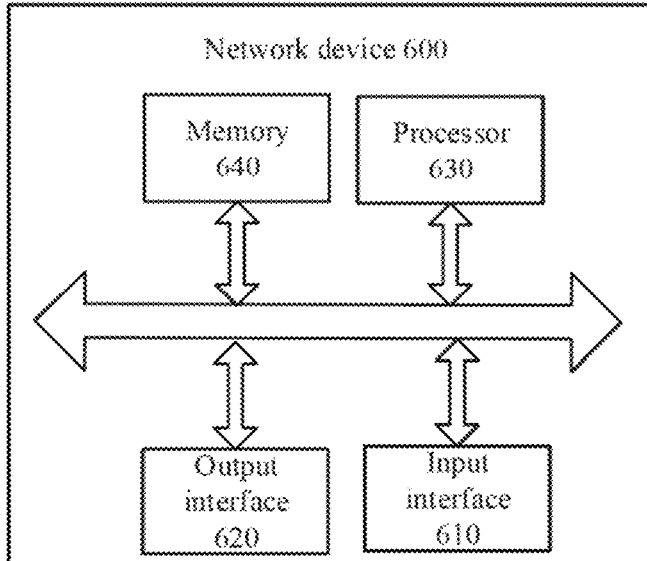
FIG. 17 illustrates another schematic block diagram of the network device for information transmission according to an embodiment of the disclosure.

As illustrated in FIG. 17, an embodiment of the disclosure further provides a network device 600 for information transmission. The network device 600 may be the network device 400 in FIG. 15, and may be configured to execute operations of the network device corresponding to the method 200 in FIG. 13. The network device 600 includes an input interface 610, an output interface 620, a processor 630 and a memory 640. The input interface 610, the output interface 620, the processor 630 and the memory 640 may be connected through a bus system. The memory 640 is configured to store a program, an instruction or a code. The processor 630 is configured to execute the program, instruction or code in the memory 640 to control the input interface 610 to receive a signal, control the output interface 620 to send a signal and complete operations in the above method embodiments.

Therefore, the network device for information transmission in this embodiment of the disclosure may improve the resource utilization while meeting the coverage requirements of the NR high-frequency band, thereby improving the flexibility of a communication system.

It should be understood that in this embodiment of the disclosure, the processor 630 may be a CPU. The processor 630 may further be other universal processors, a DSP, an ASIC, a FPGA or other programmable logic devices, discrete gates or transistor logic devices, and discrete hardware component, etc. The universal processor may be a microprocessor or the processor may also be any conventional processor, etc.

The memory 640 may include a Read Only Memory (ROM) and a Random Access Memory (RAM) and provides instructions and data for the processor 630. A part of the memory 640 may further include a nonvolatile RAM. For example, the memory 640 may further store information on a device type.

During an implementation process, the operations of the above methods may be accomplished by an integrated logic circuit of hardware in the processor 630 or an instruction in a software form. The operations of the methods disclosed in combination the embodiments of the disclosure may be directly embodied to be executed and accomplished by means of a hardware processor or executed and accomplished using a combination of hardware and software modules in the processor. The software module may be located in a mature storage medium in the art, such as an RAM, a flash memory, an ROM, a Programmable ROM (PROM), an Electrically EPROM (EEPROM) or a register. The storage medium is located in the memory 640. The processor 630 reads information from the memory 640 and completes the operations of the foregoing methods in combination with the hardware of the processor. In order to avoid repetition, the above will not be elaborated herein.

In a specific implementation, the sending unit 410 may be implemented by the output interface 620 in FIG. 17.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, an ROM, an RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for information transmission, comprising:
   sending, by a network device in a first slot or a first mini-slot, a first synchronization signal (SS) block and a first physical downlink control channel (PDCCH) to a terminal device, the first slot or the first mini-slot comprising N symbols, the first SS block occupying M consecutive symbols in the first slot or the first mini-slot, the first PDCCH occupying P consecutive symbols in the first slot or the first mini-slot, and the first SS block comprising an SS and a physical broadcast channel (PBCH), wherein M, P and N are positive integers, and $P \leq (N-M)$, wherein the P symbols occupied by the first PDCCH are non-overlapped with the M symbols occupied by the first SS block; and wherein the first SS block occupies an $(N-M+1)$th symbol to an Nth symbol of the first slot or the first mini-slot, a position of the first PDCCH in the first slot or the first mini-slot is determined, and the first PDCCH occupies a first symbol to a Pth symbol of the first slot or the first mini-slot.

2. The method of claim 1, wherein frequency domain resources occupied by the first PDCCH are non-overlapped with frequency domain resources occupied by the first SS block.

3. The method of claim 1, further comprising:

sending, by the network device, a second PDCCH to the terminal device in a second slot or a second mini-slot, wherein the second slot or the second mini-slot is non-overlapped with a slot or mini-slot including an SS block, and the position of the second PDCCH in the second slot or the second mini-slot is the same as the position of the first PDCCH in the first slot or the first mini-slot.

4. The method of claim 1, further comprising:

sending, by the network device, a second PDCCH to the terminal device in a second slot or a second mini-slot, wherein the second slot or the second mini-slot comprises is non-overlapped with a slot or mini-slot including an SS block, and the position of the second PDCCH in the second slot or the second mini-slot is different from the position of the first PDCCH in the first slot or the first mini-slot.

5. The method of claim 4, further comprising:

sending, by the network device, first indication information and second indication information to the terminal device, wherein the first indication information is configured for indicating the position of the first PDCCH in the first slot or the first mini-slot, and the second indication information is configured for indicating the position of the second PDCCH in the second slot or the second mini-slot.

6. The method of claim 5, wherein at least one of the first indication information or the second indication information is carried in the PBCH or a system message.

7. The method of claim 1, wherein the first PDCCH is configured for scheduling at least one of the following physical downlink data channels: a physical downlink data channel in the first slot or the first mini-slot, a physical downlink data channel in at least one slot or mini-slot after the first slot or the first mini-slot, or a physical downlink data channel in at least one slot or mini-slot prior to the first slot or the first mini-slot.

8. A network device for information transmission, comprising:

an output interface, configured to send, in a first slot or a first mini-slot, a first synchronization signal (SS) block and a first physical downlink control channel (PDCCH) to a terminal device, the first slot or the first mini-slot comprising N symbols, the first SS block occupying M consecutive symbols in the first slot or the first mini-slot, the first PDCCH occupying P consecutive symbols in the first slot or the first mini-slot, the first PDCCH occupying P consecutive symbols in the first slot or the first mini-slot, and the first SS block comprising an SS and a physical broadcast channel (PBCH), wherein M, P and N are positive integers, and $P \leq (N-M)$, wherein the P symbols occupied by the first PDCCH are non-overlapped with the M symbols occupied by the first SS block; and wherein the first SS block occupies an $(N-M+1)$th symbol to an Nth symbol of the first slot or the first mini-slot, a position of the first PDCCH in the first slot or the first mini-slot is determined, and the first PDCCH occupies a first symbol to a Pth symbol of the first slot or the first mini-slot.

9. The network device of claim 8, wherein frequency domain resources occupied by the first PDCCH are non-overlapped with frequency domain resources occupied by the first SS block.

10. The network device of claim 8, wherein the output interface is configured to:

send a second PDCCH to the terminal device in a second slot or a second mini-slot, wherein the second slot or mini-slot is non-overlapped with a slot or mini-slot including an SS block, and the position of the second PDCCH in the second slot or the second mini-slot is the same as the position of the first PDCCH in the first slot or the first mini-slot.

11. The network device of claim 8, wherein the output interface is further configured to:

send a second PDCCH to the terminal device in a second slot or a second mini-slot, wherein the second slot or the second mini-slot is non-overlapped with a slot or mini-slot including an SS block, and the position of the second PDCCH in the second slot or the second mini-slot is different from the position of the first PDCCH in the first slot or the first mini-slot.

12. The network device of claim 11, wherein the output interface is further configured to:

send first indication information and second indication information to the terminal device, wherein the first indication information is configured for indicating the position of the first PDCCH in the first slot or the first mini-slot, and the second indication information is configured for indicating the position of the second PDCCH in the second slot or the second mini-slot.

13. The network device of claim 12, wherein at least one of the first indication information or the second indication information is carried in the PBCH or a system message.

14. The network device of claim 8, wherein the first PDCCH is configured for scheduling at least one of the following physical downlink data channels: a physical downlink data channel in the first slot or the first mini-slot, a physical downlink data channel in at least one slot or mini-slot after the first slot or the first mini-slot, or a physical downlink data channel in at least one slot or mini-slot prior to the first slot or the first mini-slot.

15. A terminal device for information transmission, comprising:

an input interface, configured to receive, in a first slot or a first mini-slot, a first synchronization signal (SS) block and a first physical downlink control channel (PDCCH) sent by a network device, the first slot or the first mini-slot comprising N symbols, the first SS block occupying M consecutive symbols in the first slot or the first mini-slot, the first PDCCH occupying P consecutive symbols in the first slot or the first mini-slot, and the first SS block comprising an SS and a physical broadcast channel (PBCH), wherein M, P and N are positive integers, and P≤(N−M), wherein the P symbols occupied by the first PDCCH are non-overlapped with the M symbols occupied by the first SS block; and wherein the first SS block occupies an (N−M+1)th symbol to an Nth symbol of the first slot or the first mini-slot, a position of the first PDCCH in the first slot or the first mini-slot is determined, and the first PDCCH occupies a first symbol to a Pth symbol of the first slot or the first mini-slot.

16. The terminal device of claim 15, wherein frequency domain resources occupied by the first PDCCH are non-overlapped with frequency domain resources occupied by the first SS block.

17. The terminal device of claim 15, wherein the input interface is further configured to:

receive, in a second slot or a second mini-slot, a second PDCCH sent by the network device, wherein the second slot or the second mini-slot is non-overlapped with a slot or mini-slot including an SS block, and the position of the second PDCCH in the second slot or the second mini-slot is the same as the position of the first PDCCH in the first slot or the first mini-slot.

18. The terminal device of claim 15, wherein the input interface is further configured to:

receive, in a second slot or a second mini-slot, a second PDCCH sent by the network device, wherein the second slot or the second mini-slot is non-overlapped with a slot or mini-slot including an SS block, and the position of the second PDCCH in the second slot or the second mini-slot is different from the position of the first PDCCH in the first slot or the first mini-slot.

19. The terminal device of claim 18, wherein the input interface is further configured to:

receive first indication information and second indication information, wherein the first indication information is configured for indicating the position of the first PDCCH in the first slot or the first mini-slot, and the second indication information is configured for indicating the position of the second PDCCH in the second slot or the second mini-slot;

the terminal device further comprises:

a processor, configured to determine the position of the first PDCCH in the first slot or the first mini-slot and the position of the second PDCCH in the second slot or the second mini-slot according to the first indication information and the second indication information.

20. The terminal device of claim 15, wherein the first PDCCH is configured for scheduling at least one of the following physical downlink data channels: a physical downlink data channel in the first slot or the first mini-slot, a physical downlink data channel in at least one slot or mini-slot after the first slot or the first mini-slot, or a physical downlink data channel in at least one slot or mini-slot prior to the first slot or the first mini-slot.

* * * * *